(Model.)
S. D. JONES.
ROTARY ENGINE.
No. 257,587.
Patented May 9, 1882.
2 Sheets—Sheet 1.
Fig. I
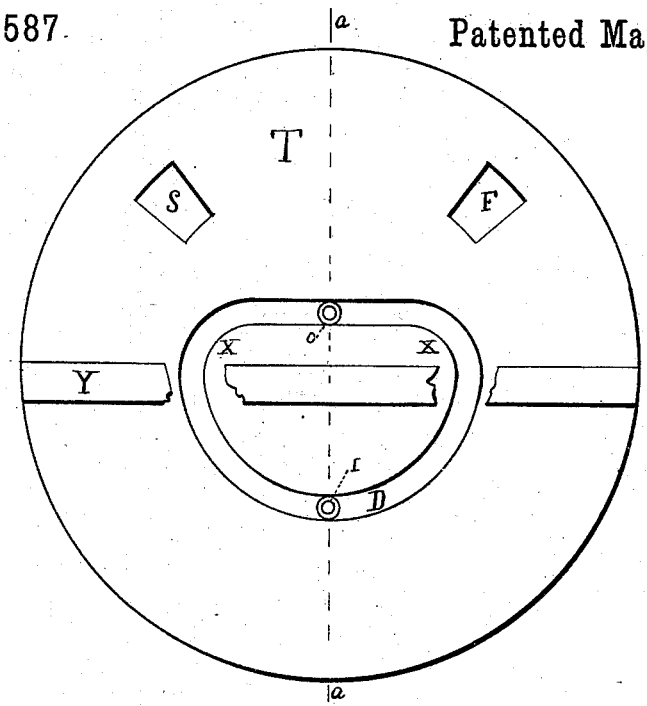
Fig. II
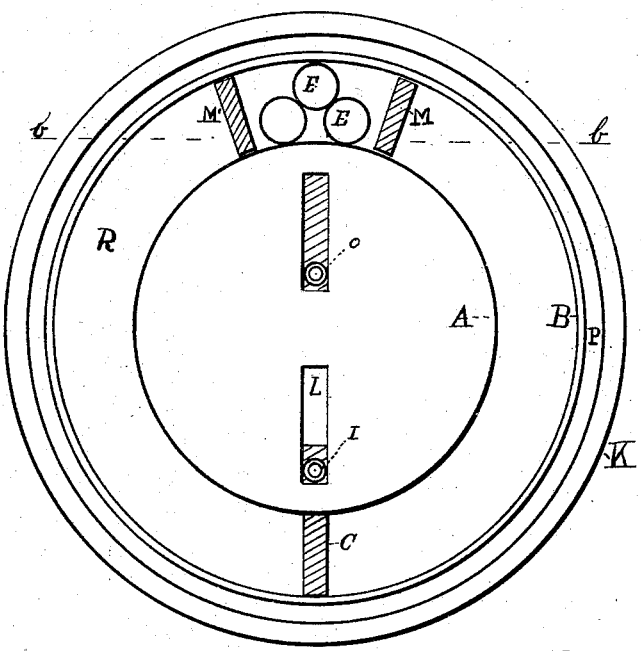
Witnesses,
Anson Atwood
Philip T. Timpson
Inventor,
Salmon D Jones
by Evan P George Jr
attorney (Model.)
S. D. JONES.
ROTARY ENGINE.
No. 257,587. Patented May 9, 1882.
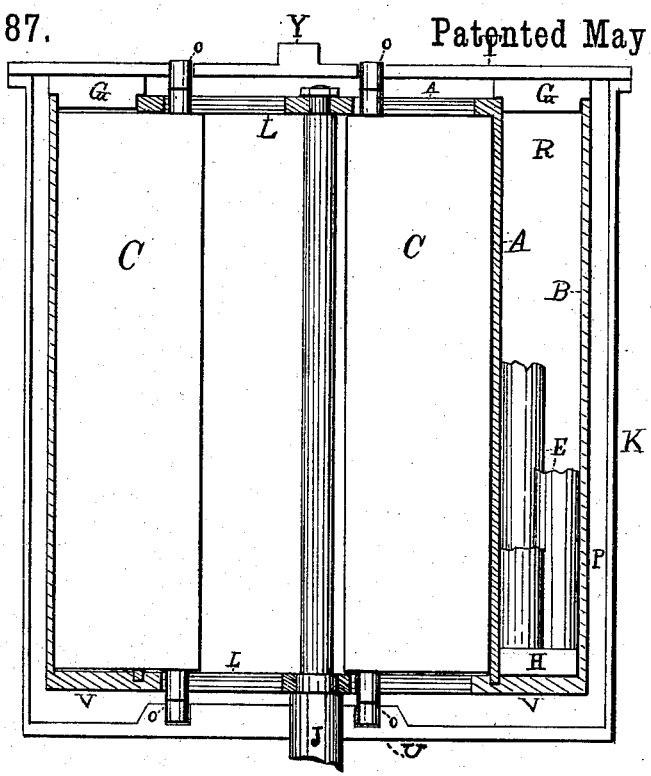
Fig. III
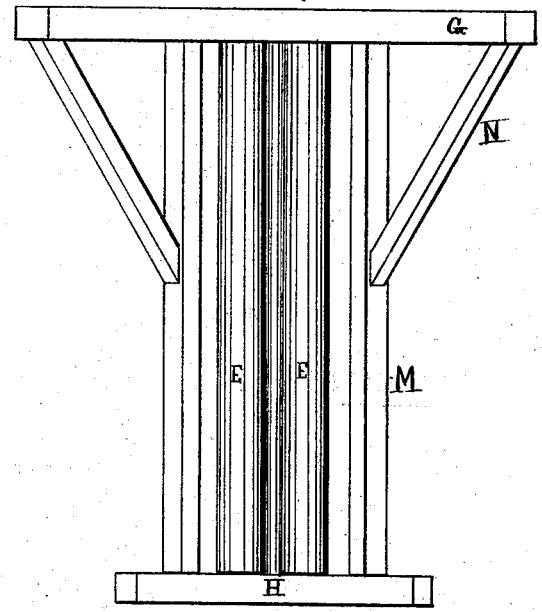
Fig. IV
Witnesses
Inventor.
Salmon D. Jones
by Evan P. George Jr.
Attorney

UNITED STATES PATENT OFFICE.

SALMON D. JONES, OF RARITAN, NEW JERSEY.

ROTARY ENGINE.

SPECIFICATION forming part of Letters Patent No. 257,587, dated May 9, 1882.

Application filed July 7, 1881. (Model.)

*To all whom it may concern:*

Be it known that I, SALMON D. JONES, a citizen of the United States, residing at Raritan, in the county of Somerset, State of New Jersey, have invented a new and useful Improvement in Rotary Engines or Pumps, of which the following is a full, clear, and exact specification, reference being had to the accompanying drawings.

My invention relates to improvements in rotary engines or pumps; and the object which I desire to accomplish by this improvement is the production of a rotary engine or pump which shall be simple in its construction and economic in its operation, and one in which friction may be reduced to a minimum.

In the drawings, Figure I is a top view of my rotary engine, showing the head with the supply and discharge or exhaust ports and the cam-groove. Fig. II is also a top view of my engine, but with the head shown in Fig. I removed, showing the cylinders, rollers, packing, and wings. Fig. III is a transverse section on the line $a\,a$ in Fig. I. Fig. IV is also a transverse section on the line $b\,b$ of Fig. II, showing my method of placing the roller abutment.

Similar letters refer to similar parts throughout the drawings.

In the drawings, A represents an inside cylinder, which is placed concentrically with an outside cylinder, B. Between these two cylinders is the annular chamber R, which is continuous from top to bottom. These cylinders are secured permanently to one and the same head V, which is shown in Fig. III, and the cylinders and the head V all revolve together.

In the inner cylinder, A, I insert the rectangular-shaped wings C, which are constructed so as to slide out and close the chamber R, or to be drawn into the cylinder A when passing the abutment. These wings C fit into slots in the cylinder A, which are indicated by L, (shown in Fig. II,) and which act as a guide for the wings C.

In the ends of the wings C, and projecting through the slots L, I place the studs I. On these studs I are placed the double rollers O. My object in placing these rollers on the studs I is to avoid the friction of the wings C when sliding in the slots L, and also the friction of the follower in the cam-groove D. These studs I, provided with the double rollers O, work in a cam-groove slot, D, which is fully shown in Fig. I, and in a similar cam-groove at the other end of the cylinder, which is shown in Fig. III. The object of these cams D is to cause the wings C alternately to slide out and close the annular chamber R, and to be drawn into the cylinder A so as to pass the abutment.

In the annular chamber R, I place a stationary abutment, consisting of two or more rollers, E, held in their position by means of a frame-work consisting of the studs M, the block H, and the braces N, all of which are firmly attached to the packing-ring G, which in turn is secured to the stationary head T. These rollers form a packing by being pressed together and against the cylinders A and B, and, together with the block H, prevent the steam from passing. The bottom of the annular chamber R in its revolutions slides under the block H.

The use of rollers obviates the necessity of using a sliding abutment; but I do not wish to be confined in this invention to the use of a roller-abutment, since the rollers may be dispensed with and a sliding abutment with spring-packing substituted.

Between the top of the cylinders A and B and the head T, which is shown in Fig. I, is placed a packing-ring, G, which is shown in section in Fig. III and also in Fig. IV. This packing-ring G is secured to the stationary head T. It closes the top of the annular chamber R, and serves at the same time for packing this end of the two cylinders A and B. The ports F and S passing through the stationary head T also pass through the ring G. This ring G may be dispensed with and the stationary head T, provided with a suitable packing, substituted in its place.

J is a shaft which extends outward from the cylinders A and B to communicate power to other machinery. The cylinders A and B and the head V all form one rigid piece.

F is the port through which steam is admitted to the annular chamber R, and S is the port through which it leaves the chamber. Around all is placed a third cylinder or shell. (Indicated by K.) This cylinder is stationary, and its head U, adjacent to the revolving head V, has in its inner surface the cam-groove shown in Fig. III, which is similar to the one in the head T. The object of placing this outside cylinder, K, around the engine is to prevent the radiation of heat; but its use may be dispensed with. The wings C at this end have likewise the studs I, with the double rollers O, for the same purpose as those in the other end, already described. To the other end of the cylinder K is attached the stationary head T.

Y is a brace across the head T, which secures the cam portion of the head in its position.

P is the space between the outside cylinder, K, and the cylinder B.

The operation of my rotary engine or pump is as follows: Steam, water, or air, as the case may be, is admitted to the annular chamber R by means of the port F, and, pressing against the abutment and the wing C, will cause it and the cylinders A and B, together with the head V, to revolve. When the studs I, provided with the double rollers O, shall have reached a position in the cam-groove D which is indicated by X, the wing C will be drawn by the action of the cam-groove D within the cylinder A, as shown in Fig. III, so as to pass the abutment. When the same wing has reached the other portion of the cam D (indicated by X) it will be released, and will slide out into the annular chamber R to receive the pressure of the steam conveyed through the port F while the other wing C is revolving in the annular chamber R, to be acted upon in turn in like manner. This motion may be reversed by making S the induction-port and F the port of eduction.

The advantage which I claim in this improvement over other rotary engines is in the revolving of both cylinders at once in connection with a single head. By this means I get rid of the wear and friction of the wings which will take place in those engines in which only one cylinder revolves, and the wings sweep around against the periphery of the other cylinder. There is also a decided advantage in the use of a roller-abutment instead of a sliding one in avoiding friction.

In my invention it will be seen that only one end is packed, and by reason of this there are fewer joints for packing than in other devices, while in addition to these advantages steam may be used expansively by means of an automatic cut-off at some point after the pressure of the steam has been brought to bear on the wings C.

When it is desired to use the engine as a pump power may be communicated by means of a pulley and the shaft J, when the cylinders will revolve, and a vacuum will be thereby created, by means of which water or air can be drawn through the port F into the annular chamber R, to be thrown out through the discharge-port S.

I am well aware that there are various devices for rotary engines and pumps; but

What I claim as new, and desire to secure by Letters Patent, is—

1. A rotary engine or pump composed of two cylinders placed concentrically one within the other, and secured at one and the same end to a disk or head, and having between them a single continuous annular chamber for pressure, said cylinders being constructed to revolve simultaneously and together, the outside cylinder revolving around the abutment in said annular chamber and the periphery of the inside cylinder against the abutment, substantially as and for the purposes described.

2. A rotary engine or pump composed of the two cylinders A and B, placed concentrically one within the other, having between them the single continuous annular chamber R, and both cylinders being secured at one and the same end to a single head, V, and constructed to revolve, as described, around an abutment, the inside cylinder, A, being provided with the sliding wings C, having the studs I and rollers O, and the wings being operated by means of the cams D, placed as described, and for the purposes set forth.

3. In a rotary engine or pump, a roller-abutment constructed to be attached, in the manner described, to the packing-ring G or to the stationary head T, and composed of two or more rollers, and of the frame-work, substantially as and for the purposes described.

4. A rotary engine or pump composed of the two cylinders A and B, placed concentrically one within the other, and secured at one and the same end to the single head V, and having at the other end the stationary head T, provided with the ports F and S, which is secured to the packing-ring G, attached to an abutment, the single continuous annular chamber R, the cams D, situated as described, and the wings C, provided with studs and rollers, substantially as described.

SALMON D. JONES.

Witnesses:
JAMES S. CHADWICK,
ANSON ATWOOD.